(12) United States Patent
Sheu

(10) Patent No.: US 9,186,615 B2
(45) Date of Patent: Nov. 17, 2015

(54) SYSTEMS AND METHODS OF INHIBITING FOAM FORMATION USING MULTIPHASE TURBINES

(71) Applicant: Feng-Ran Sheu, Sugar Land, TX (US)

(72) Inventor: Feng-Ran Sheu, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 164 days.

(21) Appl. No.: 13/889,661

(22) Filed: May 8, 2013

(65) Prior Publication Data

US 2013/0303821 A1    Nov. 14, 2013

Related U.S. Application Data

(60) Provisional application No. 61/644,181, filed on May 8, 2012.

(51) Int. Cl.
*B01D 53/14* (2006.01)
*C10L 3/10* (2006.01)

(52) U.S. Cl.
CPC ............. *B01D 53/1456* (2013.01); *C10L 3/102* (2013.01); *B01D 53/1425* (2013.01); *B01D 53/1462* (2013.01); *B01D 2252/2026* (2013.01); *B01D 2252/20478* (2013.01); *B01D 2256/24* (2013.01); *B01D 2257/304* (2013.01); *B01D 2257/504* (2013.01)

(58) Field of Classification Search
None
See application file for complete search history.

(56) References Cited

U.S. PATENT DOCUMENTS

| | | | |
|---|---|---|---|
| 2,926,753 | A | 3/1960 | Kohl et al. |
| 4,336,233 | A | 6/1982 | Appl et al. |
| 4,553,984 | A | 11/1985 | Volkamer et al. |
| 5,678,423 | A | 10/1997 | Davies et al. |
| 6,436,174 | B1 | 8/2002 | Grossmann et al. |
| 2005/0098036 | A1 | 5/2005 | Cadours et al. |
| 2006/0110300 | A1 | 5/2006 | Mak |
| 2009/0241779 | A1 | 10/2009 | Lechnick et al. |

*Primary Examiner* — Tam M Nguyen
(74) *Attorney, Agent, or Firm* — Christopher D. Northcutt

(57) ABSTRACT

Systems and methods for inhibiting foam formation in an acid gas removal system are provided. Preconditioning a rich amine or triethylene glycol stream exiting an absorber of an acid gas removal system through a rotary separation turbine can provide pre-separation of gas from rich amine or triethylene glycol, as well as effectively reduces or inhibits foam formation. Systems provided enhance plant reliability and also recovers hydraulic power into electricity.

2 Claims, 1 Drawing Sheet

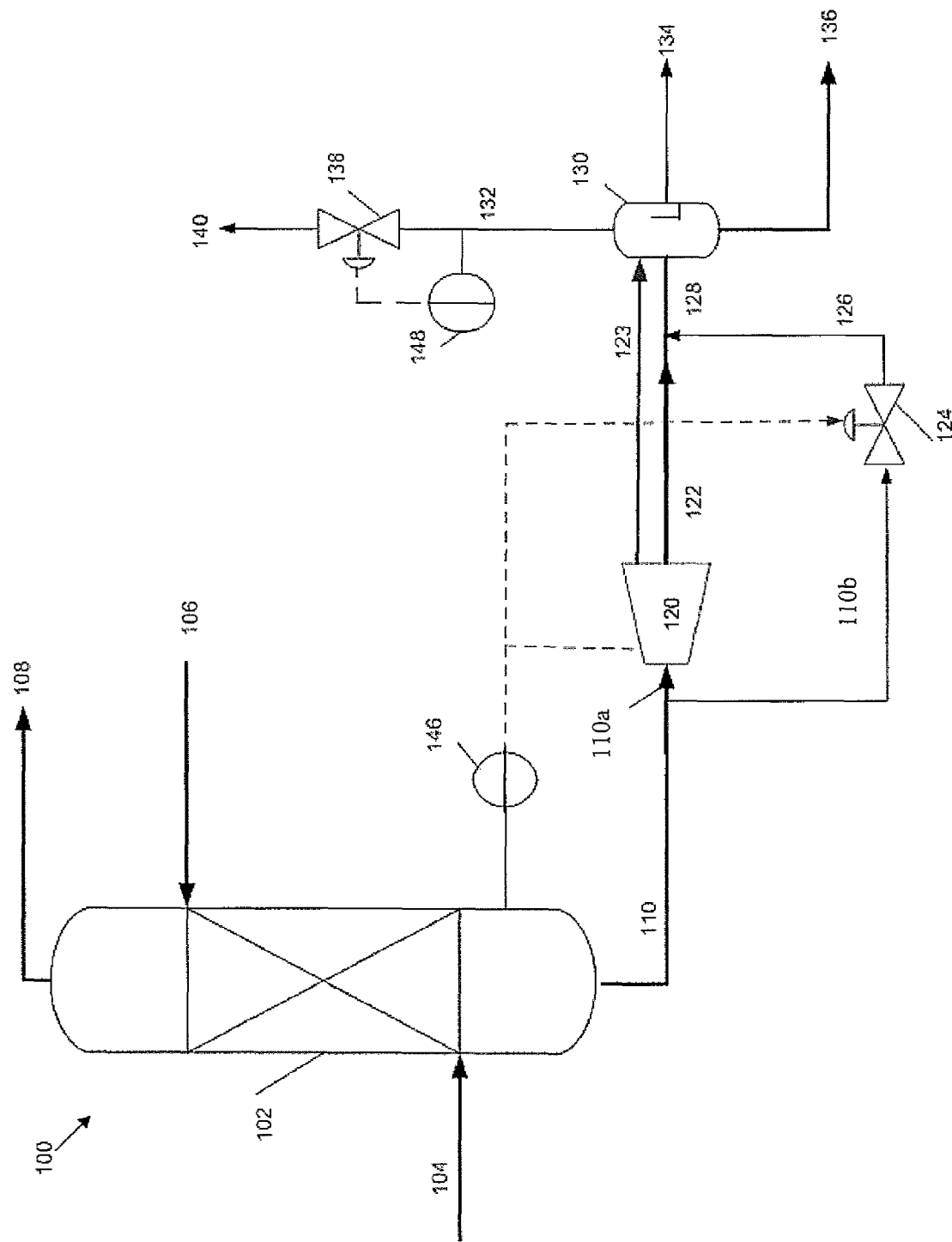

SYSTEMS AND METHODS OF INHIBITING FOAM FORMATION USING MULTIPHASE TURBINES

TECHNICAL FIELD

The present application relates to a method of reducing foam formation by preconditioning rich amine in an amine treating unit in a gas plant, such as a liquefied natural gas (LNG) plant, or an oil and gas production facility. More particularly, the present application is also directed to a method of increasing separation efficiency by reducing amine foam formation and preconditioning rich amine in an amine unit of an acid gas removal system by using multiphase turbines (rotary separation turbines), in addition to generating power during the pressure reduction step.

BACKGROUND OF THE INVENTION

In most gas processing facilities, the amine treating unit, such as an amine contactor and amine regeneration unit, is a continuous processing unit that removes acid gases from a hydrocarbon gas stream. The primary acid gases to be removed are hydrogen sulfide and carbon dioxide. Acid gases are commonly removed by contacting the hydrocarbon stream with an aqueous organic amine such as monoethanolamine (MEA), diethanolamine (DEA), methyldiethanolamine (MDEA), diisopropanolamine (DTPA), diglycolamine (DGA) triethanolamine (TEA) or others diluted in water as an aqueous amine solution. The amine solution chemically reacts with and/or physically absorbs the acid gases in an absorber (amine contactor). In the absorber, the acid gases in the hydrocarbon gas stream are removed and a sweetened gas stream and an amine solution rich in the absorbed acid gases (rich amine) at high pressure are produced. The rich amine is then introduced to an amine flash tank through a pressure reduction device to remove the light hydrocarbons with some acid gases at a much lower pressure. The amine-acid gas interaction is later reversed in a low pressure and high temperature stripper (amine regenerator), resulting in a wet acid gas stream and a reusable solvent stream (lean amine).

In an amine unit, foaming in the absorber and regenerator is a common problem due to liquid hydrocarbon contamination and other particulates in amine solution. A portion of heavier hydrocarbon components in the absorber feed gas will be absorbed by the amine solution. Foaming is likely to occur due to the low surface tension of the independent liquid hydrocarbon in the rich amine. For example, due to significant shearing by pressure letdown of the rich amine via a Joule-Thompson (JT) valve, foaming frequently occurs. The residence time of the aqueous organic amine stream in the amine flash tank may not be sufficient to allow resolution or breaking of foaming. In addition, in the two-phase rich amine after pressure letdown, the flash gas can expand from a liquid to a vapor causing uncontrollable foaming. The formation of foam in the amine flash tank or stripper unit is undesirable and can overwhelm the separation process in the tank or stripper. The formation of foam can lead to treating capacity constraints, excessive amine losses due to carryover of amine to downstream processes, off-specification products (lean amine and/or treated gas), resulting in reducing the operating rate of the unit, producing unspecified dark sulfur, increasing fouling within the lean/rich amine exchanger, and/or increasing the pressure drop within the unit. If a major foaming occurs, not only is there excessive amine carryover to downstream mol-sieve dehydration unit, but also a significant amount of carbon dioxide ($CO_2$) will be carried into the cryogenic section; in particular, for the hydrocarbon gas with high $CO_2$ content. Under both scenarios, the LNG plant may be partially or totally shut down to troubleshoot the mol-sieve dehydration uint and/or defrost the cryogenic section of the plant, resulting in a negative impact on LNG production. Typical attempts to control foaming in the stripper include the use of antifoams (silicone and nonsilicones), increasing the aqueous amine stream temperature, and/or installation of a bigger flash drum. While such methods exhibit some efficacy, they are usually only partially successful in addressing downstream operating problems or are costly to implement. For example, continuous addition of antifoams to solve the foaming problem may lead to further worsening problem, unstable operations, and increased operational expenditure.

BRIEF DESCRIPTION OF THE DRAWING

For a more complete understanding of the exemplary embodiments of the present invention and the advantages thereof, reference is now made to the following description in conjunction with the accompanying drawing, which is briefly described as follows.

FIG. 1 is a schematic diagram of a system for inhibiting the formation of foam in an acid gas removal system, according to an exemplary embodiment.

DESCRIPTION OF THE PREFERRED EMBODIMENTS

Illustrative embodiments of the invention are described below. In the interest of clarity, not all features of an actual implementation are described in this specification. One of ordinary skill in the art will appreciate that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention may be better understood by reading the following description of non-limitative embodiments with reference to the attached drawing wherein like parts of each of the figures are identified by the same reference characters. The words and phrases used herein should be understood and interpreted to have a meaning consistent with the understanding of those words and phrases by those skilled in the relevant art. No special definition of a term or phrase, for example, a definition that is different from the ordinary and customary meaning as understood by those skilled in the art, is intended to be implied by consistent usage of the term or phrase herein. To the extent that a term or phrase is intended to have a special meaning, for instance, a meaning other than that understood by skilled artisans, such a special definition will be expressly set forth in the specification in a definitional manner that directly and unequivocally provides the special definition for the term or phrase. Moreover, various streams or conditions may be referred to with terms such as "high," "low," "rich," "lean,", "sweet" etc., or other like terminology. Those skilled in the art will recognize that such terms reflect conditions relative to another process stream, not an absolute measurement of any particular property.

FIG. 1 shows an acid gas removal system 100, according to an exemplary embodiment of the present invention. The system 100 includes an amine absorber 102 for processing an untreated hydrocarbon gas stream 104. In certain exemplary embodiments, the absorber 102 is a high pressure, moderate temperature vessel in which acid gas present in the untreated gas stream 104 reacts or interacts with an aqueous, organic amine stream 106 (lean amine stream). Generally, the untreated gas stream 104 is a hydrocarbon stream that includes gases containing hydrogen sulfide or both hydrogen sulfide and carbon dioxide (e.g. sour gases or acid gases). The aqueous, organic amine stream 106 flows downward in the absorber 102 and absorbs the hydrogen sulfide and carbon dioxide from the upward flowing untreated gas stream 104 to produce a sweet gas stream 108 and a rich amine stream 110. The sweet gas stream 108 is generally free of hydrogen sulfide and carbon dioxide. The rich amine stream 110 is an amine solution carrying absorbed acid gases, heavy hydrocarbon components, and small solid particles. In certain embodiments the formation of hydrocarbon-in-water or water-in-hydrocarbon emulsions can occur in the absorber 102. If water-in-hydrocarbon emulsions form, the presence of water in the untreated gas stream can overload downstream hydrocarbon processing units. The formation of hydrocarbon-in-water (rich amine) emulsions can also adversely impact treatment of the aqueous, lean amine stream 106 prior to its reuse. Accordingly, it is desirable to reduce foam formation in the system 100 to assure a successful removal of acid gas from the treated gas.

A first portion 110a of the rich amine stream 110 enters a multiphase, or rotary separation turbine 120 having an impeller driven by high speed flow from an inlet nozzle (not shown). In certain embodiments, under normal conditions, the entire rich amine stream 110 enters the rotary separation turbine 120 to maximize separation efficiency. The centrifugal force due to turbine rotation can decrease the foaming that occurs within the system, and thus reduce foaming of rich amine in the amine flash tank 130. In certain exemplary embodiments, the rich amine stream 110a can be separated in the rotary separation turbine 120 to produce a liquid rich amine stream 122 substantially free of foaming and vapor (flash gas) and a flash gas stream 123 substantially free of foaming and liquid. In certain embodiments, the rich amine stream 122 includes less than about 0.5 percent (%) vapor, and in certain exemplary embodiments, less than about 0.1% vapor. In certain embodiments, the flash gas stream 123 includes less than about 0.5% liquid, and in certain exemplary embodiments, less than about 0.1% liquid. In certain exemplary embodiments, the foam-free rich amine and flash gas streams 122, 123 are introduced to a separations vessel, such as an amine flash tank 130, separately. Since the rich amine stream 122 is substantially free of vapor, foaming due to agitation within the flash tank 130 is minimal.

Suitable examples of a rotary separation turbine 120 include, but are not limited to, variable phase turbines having a rotary impeller within a chamber (not shown) and commercially available from Energent Inc. Generally, the rich amine stream 110a is introduced into the rotary separation turbine 120 via an inlet nozzle (not shown). In certain exemplary embodiments, the rich amine stream 110a enters the inlet nozzle at a high speed, and in some cases, an amount of vapor is produced prior to the rich amine stream 110a exiting the nozzle. The chamber of the rotary separation turbine 120 receives the multi-phase stream from the nozzle, and the impeller within the chamber is designed to rotate at a high speed, which subsequently can depress foaming. In addition to reducing foaming, the rotation of the impeller generates power, as well as effectively separates the gas phase from the liquid phase.

In certain embodiments, a second portion 110b of the rich amine stream 110 can be directed to a throttle or JT valve 124 to produce a reduced pressure rich amine stream 126. In certain embodiments, during the start-up and/or rotary turbine malfunction, the entire rich amine stream 110 is directed to the JT valve 124. The rich amine stream 122 and the reduced pressure rich amine stream 126 can be combined to form a rich amine stream 128 that is then routed with the flash gas stream 123 to the amine flash tank 130 to produce a light hydrocarbon stream 132 having some acid gas vapor, a liquid hydrocarbon stream 134, and a rich amine stream 136. In certain exemplary embodiments, the light hydrocarbon stream 132 includes inert gases, hydrocarbon gas, carbon dioxide, and the like, and can be routed to a pressure control valve, or throttle, 138 to produce a reduced pressure light hydrocarbon gas stream 140 for a low pressure fuel gas system. The rich amine stream 136 can be further routed to an amine regenerator (not shown). In certain embodiments, a level controller 146 is utilized to maintain a liquid level of the absorber 102. In certain embodiments, a pressure controller 148 is utilized to maintain a constant operating pressure of the amine flash tank.

The present application is generally directed to acid gas removal systems and methods for reducing or inhibiting foam formation and pre-separation of absorbed gas and rich amine therein. The application can also be applied to a triethylene glycol (TEG) dehydration unit in any gas treating plant. For instance, the aqueous, organic amine stream 106 (lean amine stream) entering the absorber 102 would be replaced with a lean TEG stream to produce a rich TEG stream instead of the rich amine stream 110. The exemplary systems may include an absorber, a rotary separation turbine with an internal impeller and separation chamber, and a separation vessel. The present invention is advantageous over conventional JT valves in the acid gas removal systems and methods as it enhances the separation efficiency, and to a lesser extent recovers power, thus increasing process efficiency and operation reliability. Similar processing can be completed for either liquid physical or chemical solvents that utilize the absorption and removal of acid gases. The ability to accomplish some mechanical/centrifugal separation of multiphase components in the stream at a higher efficiency could be beneficial to gas plant production and reduce operating expenses. For instance, if a natural gas contains high acid gas content, a higher power recovery is expected due to a higher amine circulation rate. In addition, by pre-conditioning the rich amine stream, such as by foaming depression and separation of vapor and liquid, before the stream is introduced into the amine flash tank, an improved separation of gas-liquid(aqueous)-liquid(hydrocarbon) can be maintained, which can lead to maintaining the treating capability of the amine treating system. High acid gas content in a high throughput plant will require a high solvent circulation rate, which generally serves to enhance the possible benefits that may be expected.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. A method of reducing hydrocarbon induced foaming in acid gas removal system employing a hydrocarbon stream and an aqueous, organic amine stream, the method comprising:
   contacting the hydrocarbon stream with the aqueous, organic amine stream in an absorber to produce a sweet gas stream and a rich amine stream;
   directing the rich amine stream to a rotary separation turbine having an impeller and a chamber for processing the rich amine stream to produce a reduced foam rich amine stream; and
   directing the reduced foam rich amine stream to a separation vessel;
   wherein
   the reduced foam rich amine stream comprises a flash gas and a liquid reduced foam rich amine stream; and
   the flash gas and the liquid reduced foam rich amine stream enter the separations vessel separately.

2. The method of claim 1, wherein the separations vessel is a flash tank.

* * * * *